United States Patent
Strasser et al.

[11] Patent Number: 5,842,342
[45] Date of Patent: Dec. 1, 1998

[54] FIBER REINFORCED CERAMIC MATRIX COMPOSITE INTERNAL COMBUSTION ENGINE INTAKE/EXHAUST PORT LINERS

[75] Inventors: Thomas Edward Strasser, Corona; Steven Donald Atmur, Riverside, both of Calif.

[73] Assignee: Northrop Grumman Corporation, Los Angeles, Calif.

[21] Appl. No.: 803,961

[22] Filed: Feb. 21, 1997

[51] Int. Cl.$^6$ .................................................. F01N 3/00
[52] U.S. Cl. .......................... 60/282; 60/272; 123/193.5
[58] Field of Search ........................... 60/272, 282, 323; 123/193.5

[56] References Cited

U.S. PATENT DOCUMENTS

| | | | |
|---|---|---|---|
| 4,031,699 | 6/1977 | Suga et al. ................................ | 60/282 |
| 4,206,598 | 6/1980 | Rao et al. . | |
| 4,207,660 | 6/1980 | Rao et al. . | |
| 4,341,826 | 7/1982 | Prewo et al. . | |
| 4,676,064 | 6/1987 | Narita et al. ............................... | 60/272 |
| 4,715,178 | 12/1987 | Tsukuda et al. ......................... | 60/272 |
| 5,000,136 | 3/1991 | Hansen et al. . | |
| 5,066,626 | 11/1991 | Fukao et al. . | |
| 5,076,054 | 12/1991 | Akimune et al. ........................ | 60/272 |
| 5,488,018 | 1/1996 | Limaye ................................... | 501/104 |
| 5,593,745 | 1/1997 | Haselkorn .............................. | 428/34.5 |

Primary Examiner—Thomas E. Denion
Attorney, Agent, or Firm—Terry J. Anderson; Karl J. Hoch, Jr.

[57] ABSTRACT

A heat-resistant, thermally insulative, ductile port liner for a head of an internal combustion (IC) engine having a tube-shaped structure formed from at least one layer of fiber reinforced ceramic matrix composite (FRCMC) material. The FRCMC material includes a polymer-derived ceramic resin in its ceramic form and fibers. In a first embodiment of the port liner, the tube-shaped structure has one FRCMC layer forming the sole, solid wall of the structure. Whereas, in a second embodiment, the tube-shaped structure has two FRCMC layers forming inner and outer walls of the structure, respectively, with an intervening space separating the inner and outer walls. The intervening space is sealed at both ends. It can be filled with a thermally insulating material, evacuated and held at substantially a vacuum pressure, or filled with a gas. Once the port liner has been formed, it is preferably cast-in-place when the metal head of the IC engine is formed. This entails positioning the port liners within a mold designed to form the metal head in locations corresponding to the intake and exhaust ports of the head. Then, the mold is filled with molten metal to form the head with the port liners being integrally cast therewith.

20 Claims, 7 Drawing Sheets

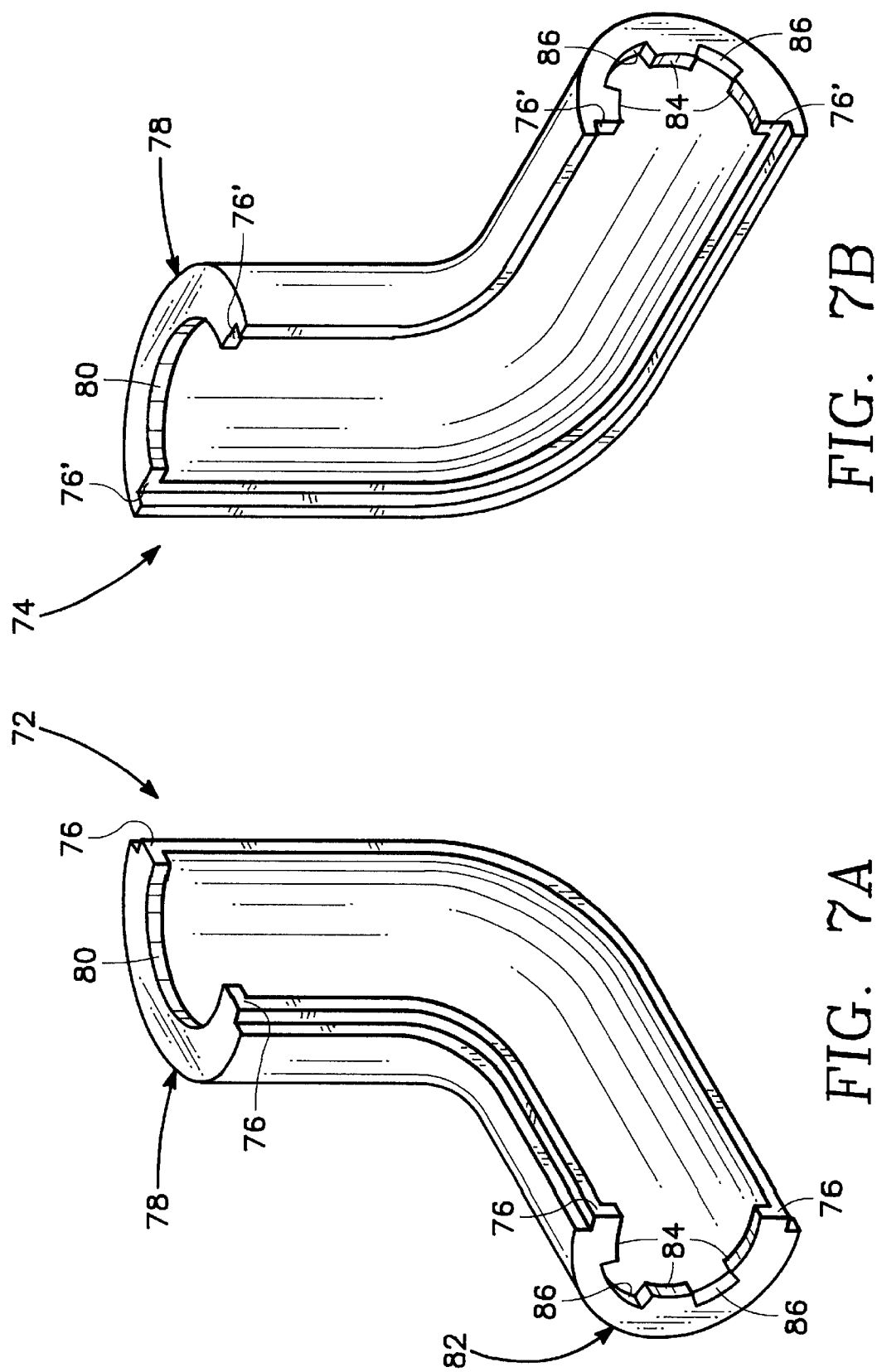

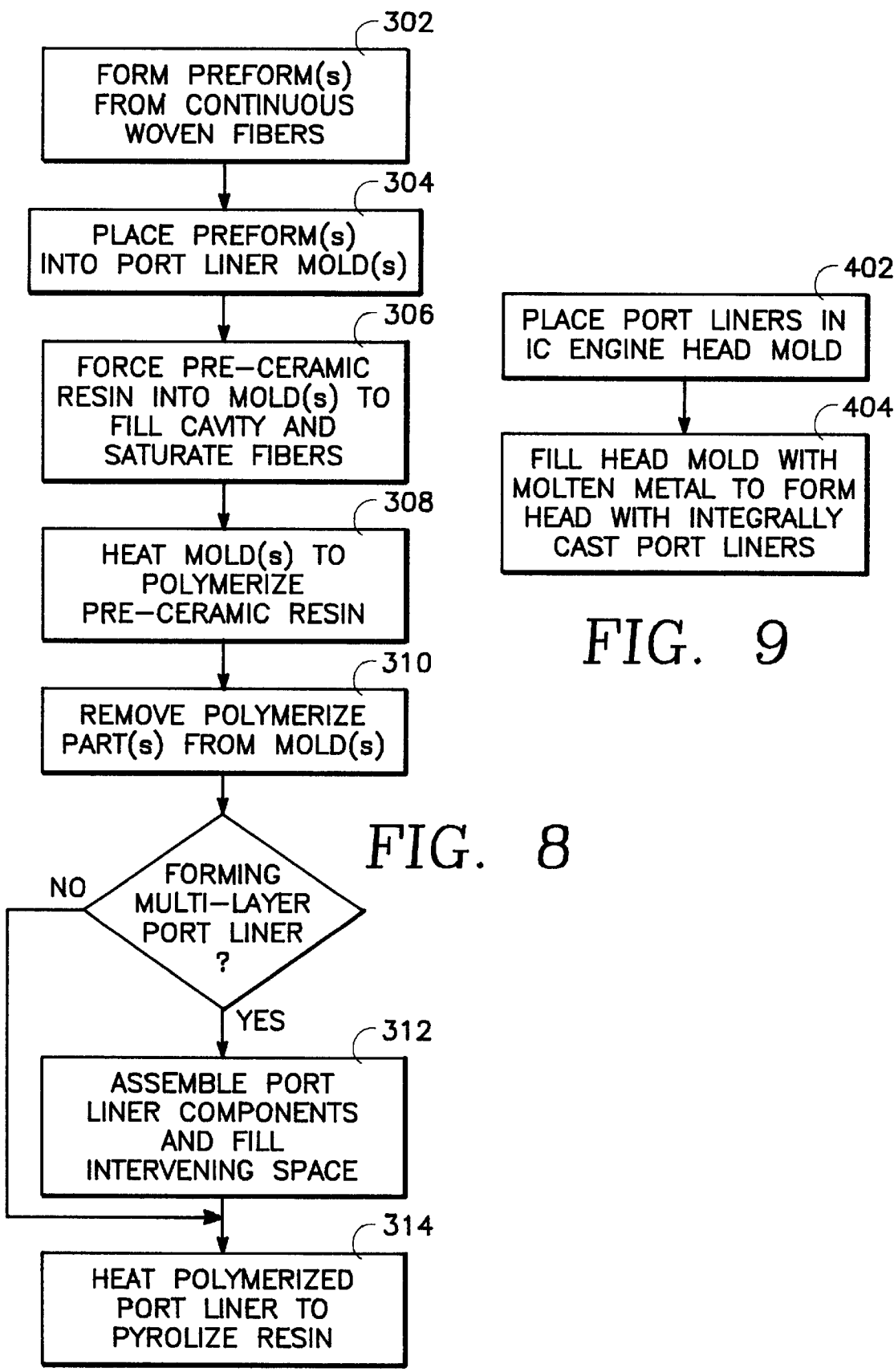

FIBER REINFORCED CERAMIC MATRIX COMPOSITE INTERNAL COMBUSTION ENGINE INTAKE/EXHAUST PORT LINERS

BACKGROUND

1. Technical Field

This invention relates to intake and exhaust port liners for the head of an internal combustion (IC) engine, and more particularly, to such port liners formed of a fiber reinforced ceramic matrix composite (FRCMC) material and methods for making them.

2. Background Art

Exhaust port liners in an internal combustion (IC) engine are used to conserve the residual heat of exhaust gases traveling through them from the cylinder to the exhaust manifold. Conserving the residual heat of the exhaust gases has many advantages. First, it reduces the amount of heat transferred to the head and block of the engine. The heat transferred to the engine must be dissipated, typically by employing water passages which circulate coolant from a radiator. The more heat transferred, the larger the water passages have to be in order to cool the engine. Larger passages mean a bigger, heavier engine, as well as a bigger radiator. The net result is to increase the size and weight of a engine which is disadvantageous for several reasons including performance and fuel economy. Thus, reducing the transfer of heat from the exhaust gases to the engine allows for a smaller, more fuel efficient engine.

The performance and fuel economy of an engine can also be improved by increasing the temperature of the combustion chamber (i.e. the cylinder). This improvement results because the higher chamber temperatures cause a more complete burning of the fuel. Therefore, more energy is transferred and less fuel is required to drive the engine. However, in the past this has not been possible because, among other things, the cooling system of the engine would have to be upgraded as described above, thereby adding to its size and weight. By reducing the heat transfer to the head and block of the engine, a higher combustion chamber temperature could be maintained without the need to upgrade the cooling system.

Another key advantage of conserving the residual heat of the exhaust gases traveling through an exhaust port is in controlling engine emissions. The heat residue in the exhaust gases causes further oxidation of pollution causing unburned fuel components. In addition, current emission control devices, such as a catalytic converter, which are typically disposed downstream of the ports in a vehicle's exhaust system, require hot exhaust gases to perform efficiently. Essentially, these devices operate by reacting with the exhaust gases to cause further oxidation of the unburned fuel components. A high temperature is required to facilitate this reaction. Therefore, the more retained heat in the exhaust gas, the more effective the emission control device is at reducing pollution levels from the engine.

The use of intake port liners in an IC engine also has advantages. As the vaporized fuel/air mixture travels through an un-lined intake port of an IC engine, heat is transferred from the engine head to the fuel-air mixture causing it to expand and increase in pressure. The fuel-air mixture is ultimately compressed in the cylinder of the engine. As such, the aforementioned expansion and increase in pressure requires that more energy be expended to compress the vaporized fuel/air mixture. Therefore, the transfer of heat to the fuel-air mixture as it passes through the intake port, decreases the efficiency of the engine. The intake port liners are designed to thermally insulate at least a portion of the intake ports of the engine, thereby decreasing the transfer of heat to the vaporized fuel and improving the efficiency of the engine.

One typical port liner used in the past is a monolithic ceramic liner. This type of liner is inserted into the exhaust port bore of an engine to thermally insulate the head and block from the exhaust gases flowing through the exhaust ports. In addition, monolithic ceramic port liners are inserted into the intake port bores of an IC engine to thermally insulate vaporized fuel from the head and block of the engine. These monolithic ceramic port liners are usually made from a sintered powderized ceramic material, such as alumina or zirconium. The ceramic port liners can withstand very high temperatures (e.g.>2000°F.) and provide an excellent thermal insulative effect so as to minimize the transfer of heat. However, monolithic ceramic structures are very limited in the shapes in which they can be formed. For example, a straight cylindrical shape is possible, but not one having a bend. This causes some problems in that the port structures of an IC engine usually have complex paths, often including a severe bend. As the monolithic ceramic liner is typically limited to a straight cylindrical shape, they often take the form of short inserts insulating the straight portions of the port. However, the bend area in left uninsulated resulting in a local "hot spot" in the head which requires the use of larger cooling passages in that region, and all the disadvantages associated with the larger cooling requirements. In addition, local "hot spots" can create a mismatch in the thermal expansion of the head and cause it to crack. This situation is made worse by the fact that the bend in the exhaust port corresponds to the location where the hot exhaust gases directly impinge on the walls of the port, and is a site of increase turbulence in the flow of the exhaust gases. Thus, the bend is the site where the heat transfer is at its greatest, and so the place where insulation is most needed.

In addition, monolithic ceramic port liners tend to be porous and brittle. These parts are easily broken or cracked when impacted, or otherwise subjected to even moderate forces. They are also strain intolerant and cannot be deflected more than 0.09 percent without being fractured. This makes inserting the monolithic ceramic port liners into the ports a delicate operation which can easily lead to broken pieces. In addition, thermal expansion and contraction of the head around the relatively "expansion-stable" ceramic liner must be considered. For example, if the head were to contract due to being exposed to cold, care must be taken to ensure there is enough clearance between the walls if the port and the liner to prevent excessive strain being placed on the liner. If the strain is too much, the liner can fracture and fail.

As mentioned above, monolithic ceramic liners are designed to be inserted into a port bore, which can be a very difficult task owing to the delicate nature of the ceramic material. Thus, the insertion process can be costly and time consuming. One desirable option would involve casting the liner directly into the head when it is formed. This would eliminate the insertion step altogether. However, monolithic ceramic liners tend to be thermal shock sensitive. The sudden change in temperature when molten metal used to cast the head is poured around them would cause the liner to fracture and fail. Consequently, casting monolithic ceramic port liners in place is not a viable option without using some intermediate material between the liner and the molten metal.

Accordingly, there is a need for a port liner which exhibits high temperature resistance and thermal insulative capability, but which can be formed into complex shapes so as to insulate the entire length of a port bore. In addition, there is a need for such a port liner which is ductile and less susceptible to fracturing due to handling or thermally-induced strains, than a monolithic ceramic liner. This port liner should also be able to be cast in place when molding the head of the engine.

Wherefore, it is an object of the present invention to provide a port liner which can be formed into practically any shape and size desired, so as to be made to conform to the shape of the port bore in the head of a IC engine.

Wherefore, it is another object of the present invention to provide a port liner which is ductile and fracture resistant, and capable of withstanding thermally-induced strains.

Wherefore, it is still another object of the invention to provide a port liner which can withstand the thermal shock of being cast in place while forming the head of an IC engine.

SUMMARY

The above-described objectives are realized with embodiments of the present invention directed to a heat-resistant, thermally insulative, ductile port liner for a head of an internal combustion (IC) engine having a three-dimensional tube-shaped structure comprised of at least one layer of fiber reinforced ceramic matrix composite (FRCMC) material. The FRCMC material includes a polymer-derived ceramic resin in its ceramic form and fibers. The ceramic portion of the material for the most part provides the heat-resistance and thermal insulating capabilities of the FRCMC material, while the fibers produce a desired degree of ductility in the FRCMC material (although when ceramic fibers are used they will also contribute to the insulative capability of the material). Ductility for the purposes of the present invention is defined as the amount strain a sample of the FRCMC material can withstand before fracturing.

Forming a port liner of FRCMC material has significant advantages over the prior monolithic ceramic liners. First, FRCMC material can be formed into practically any shape and size desired. This allows a FRCMC port liner to be made to conform to the shape of even a port bore having a complex shape. For example, the port liner of the present invention can include severe bends, such as the right angle bend found in many port bore configurations. FRCMC material being very ductile makes the port liner fracture resistant and capable of withstanding thermally-induced strains which may be imparted to the liner when employed in an IC engine. In addition, this ductility gives the FRCMC port liner the ability to withstand thermal shock. Therefore, once the port liner has been formed, it can be cast-in-place when the metal head of the IC engine is formed. This eliminates all the added steps and difficulties associated with inserting a port liner into an already cast engine head. In addition, this allows a port liner with a complex shape (e.g. one with a severe bend) to be incorporated into the head, something that cannot be done using an insertion method. The cast-in-place method generally entails positioning the port liners within a mold designed to form the metal head in locations corresponding to the ports of the head. Then, the mold is filled with molten metal to form the head with the port liners being integrally cast therewith.

In a first embodiment of the port liner, the tube-shaped structure has one FRCMC layer forming the sole, solid wall of the structure. Whereas, in a second embodiment, the tube-shaped structure has two FRCMC layers forming inner and outer walls of the structure, respectively, with an intervening space separating the inner and outer walls. The intervening space is sealed at both ends. It can be filled with a thermally insulating material, evacuated and held at substantially a vacuum pressure, or filled with a gas. The insulating material would preferably be at least one of ceramic powder, ceramic foam, and fibers, and the gas can be one or more of argon, nitrogen, and air.

The polymer-derived ceramic resin used to form the FRCMC material is preferably either silicon-carboxyl resin or alumina silicate resin, and the fibers are preferably at least one of alumina, Nextel 312, Nextel 440, Nextel 510, Nextel 550, silicon nitride, silicon carbide, HPZ, graphite, carbon, and peat. The aforementioned degree of ductility caused by the fibers varies with the percentage by volume of the fibers in the FRCMC material. There is preferably a sufficient quantity of fibers to produce the desired degree of ductility. For example, if the percentage by volume of the FRCMC material consisting of the fibers is within a preferred range of about 20 to 60 percent, a degree of ductility between 0.15 percent and 0.60 percent strain will be produced. In addition, the form of the fibers incorporated into the FRCMC material is either continuous or non-continuous. The form of the fibers also affects the degree of ductility exhibited, with continuous fiber configurations providing more ductility than non-continuous configurations. Preferably, the fiber form employed is chosen to, in combination with the quantity of fibers, produce the desired degree of ductility. The fibers are also preferably coated with an interface material which increases the ductility exhibited by the FRCMC material so as to facilitate producing the desire degree of ductility. Specifically, the interface material preferably includes at least one 0.1–5.0 micron thick layer of at least one of carbon, silicon nitride, silicon carbide, and boron nitride. The FRCMC material can also further incorporate a filler material which increases the thermal insulating capability of the material. Specifically, the filler material can include one or more of the following: alumina, silicon carbide, silicon nitride, or other commercially available ceramic powders. The degree of thermal insulation provided by the filler material varies with the percentage by volume of the structure consisting of the filler material. Accordingly, a sufficient quantity of filler material should be incorporated to produce the desired degree of thermal insulation. Preferably, the percentage by volume of the FRCMC material consisting of the filler material is within a range of about 10 to 40 percent.

Either embodiment of the port liner of the present invention is preferably formed by an injection molding process if non-continuous "chopped" fibers can be used and still produce the desired degree of ductility. However, if continuous woven fibers are employed, such as to achieve the desired degree of ductility, it is preferred that a resin transfer molding (RTM) process be employed to form the port liner.

In addition to the just described benefits, other objectives and advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

FIGS. 7A–B are perspective views of the two side pieces of the outer layer of the multi-layer port liner of FIG. 2A.

FIG. 8 is a block diagram of a method for the resin transfer molding of the port liner of either FIG. 1 or FIG. 2A.

FIG. 9 is a block diagram of a method for integrally casting the port liner of either FIG. 1 or FIG. 2A with the head of an IC engine.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
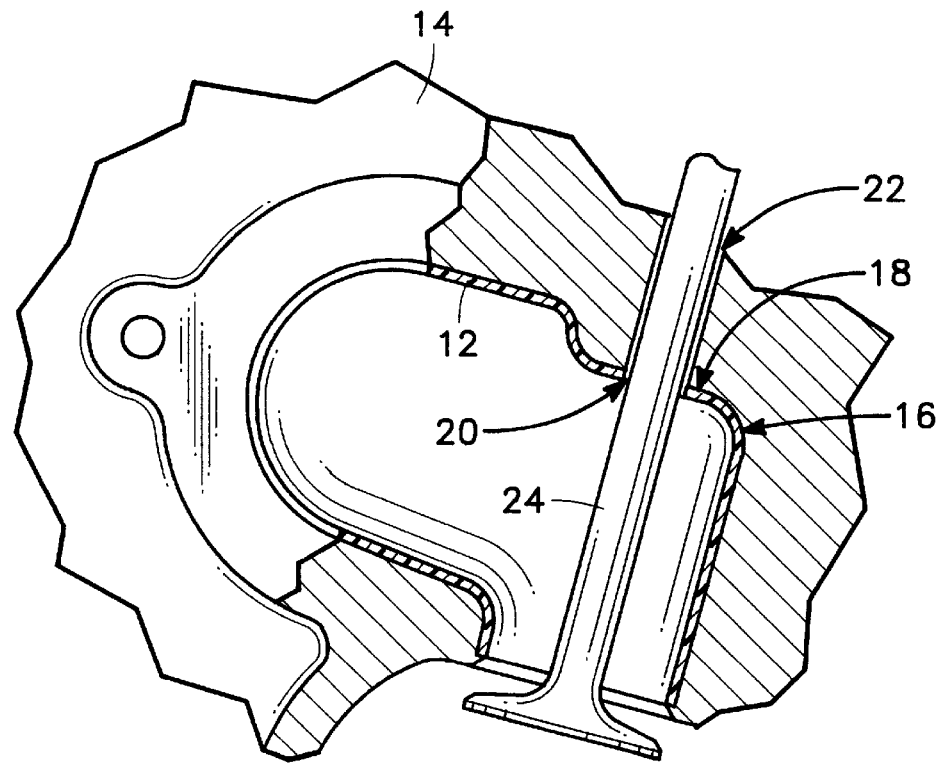
FIG. 1 is a sectional view of a port of an internal combustion (IC) engine and adjacent structures incorporating a solid wall embodiment of a port liner in accordance with the present invention.

FIG. 1 depicts a first embodiment of a port liner 12 in accordance with the present invention. In the first embodiment, the port liner 12 is a cylindrical, three-dimensional tube having a solid fiber reinforced ceramic matrix composite (FRCMC) wall. Being made of FRCMC allows the port liner 12 to be formed in complex shapes. For example, the port liner 12 of FIG. 1 has an elbow 16 amounting to a nearly right angle turn. There is also a flattened area 18 adjacent the elbow and a hole 20, both of which are associated with valve guide entrance 22 to allow access for a valve 24. The ability to form complex shapes enables the entire length of an intake or exhaust port of an internal combustion (IC) engine to be lined. This is key to effectively insulating the head 14 from the residual heat of the exhaust gases flowing through the exhaust port, and insulating vaporized fuel flowing through the intake port from the transfer of heat from the head 14. It is noted that the thicker the wall of the liner 12, the greater its insulative effect. A single-layered port liner 12 as depicted in FIG. 1, with an appropriate wall thickness, is capable of reducing the transfer of heat from the exhaust gases to the head to acceptable levels in many applications. The appropriate thickness can be readily determined using well known methods by determining the thermal conductivity of the particular type of FRCMC material employed for the port liner 12 and computing the thickness necessary to achieve the desired degree of insulation for the IC engine being adapted with port liners according to the present invention. In some cases, the desired heat transfer rate (i.e. insulative effect) may not be achievable by simply increasing the wall thickness of the port liner 12 because at some point the wall thickness would interfere with adjacent structures of the engine head 14. In such cases, a multi-layered embodiment of the present invention can be employed.

Figure 2A:
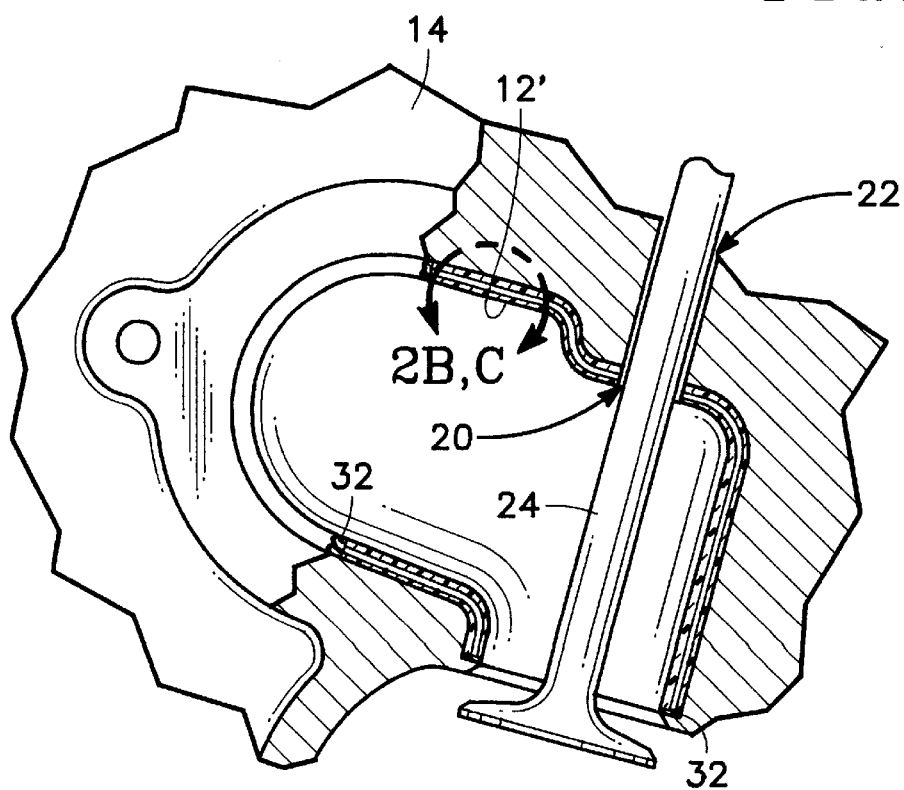
FIG. 2A is a sectional view of a port of an IC engine and adjacent structures incorporating a multi-layered embodiment of a port liner in accordance with the present invention.
Figure 2B:
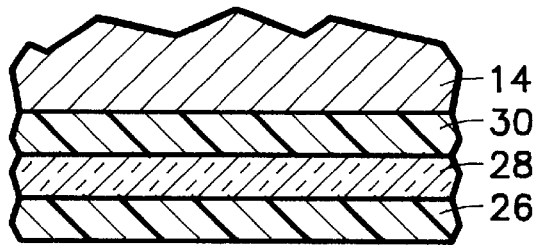
FIG. 2B is an enlarged portion of the sectional view of FIG. 2A depicting a version thereof employing an intermediate insulating layer.
Figure 2C:
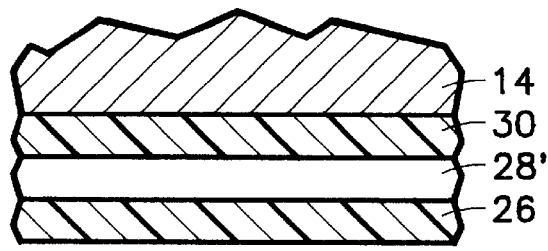
FIG. 2C is an enlarged portion of the sectional view of FIG. 2A depicting a version thereof employing a intervening space between the inner and outer walls of the port liner.

The multi-layered port liner embodiment is depicted in FIG. 2A. Here again, the port liner 12' can be formed in complex shapes and will extend the entire length of the port of the engine head 14. The primary difference between the single-layer and the multi-layer embodiments is the inclusion of an insulation layer between each layer of FRCMC material. In the illustrated example, the port liner 12' includes three layers. As seen in FIGS. 2B the three layers can include an inner layer 26, an intermediate layer 28, and an outer layer 30. The inner and outer layers are formed from a FRCMC material, while the intermediate layer 28 is the aforementioned insulation layer and is made up of a material having an extremely low thermal conductivity. For example, the intermediate layer 28 can comprise such materials as ceramic powder, ceramic foam, dry fibers, diatomaceous earth, or other high temperature capable insulating materials. In general, the chosen material for the intermediate layer 28 can be any material exhibiting an extremely low thermal conductivity and being capable of withstanding the temperature expected to be produced in the port liner 12'. Alternately, the insulating layer can take the form of a space 28' separating the inner and outer layers 26, 30. The space 28' is preferably sealed at both ends, such as by a thin ring 32 of FRCMC material integrally formed with the inner and outer layers 26, 30 (as shown in FIG. 2A). Of course, other sealing methods would also be acceptable and may be employed as desired. Further, it is preferred that the version of the multi-layered embodiment having an intermediate layer 28 comprising insulating material also be sealed at both end via any appropriate method, as necessary, to retain the insulating material in the intermediate layer 28. The space 28' can be evacuated of most of the air and held at a near vacuum pressure. Alternately, the space 28' can be filled with a gas, such as shown in FIG. 2C. This gas can include argon, nitrogen, or air. The gas filling the space 28' (or absence thereof in the case of a vacuum pressure) provides the desired insulating effect.

Interrupting the inner and outer layers 26, 30 with the above-described insulating layer overcomes the limitations of a solid FRCMC port liner 12 (of FIG. 1) by effectively increasing the overall insulating capability of the liner 12' (of FIG. 2A–C). In this way, the thickness of the multi-layered port liner 12' can be smaller, in comparison to a the solid wall embodiment, while at the same time providing the desired rate of thermal transfer. Again, the appropriate thicknesses for the inner layer 26, outer layer 30, and intermediate layer 28 or space 28', which will produce the desired insulative effect can be readily determined using well known methods.

Although a three layer version of the multi-layer embodiment is preferred in order to simplify the construction of the port liner, additional layers are possible. For example, the wall of the liner could include inner, intermediate, and outer FRCMC layers wherein the intermediate layer is separated from the inner and outer layers by separate intervening insulating layers. This five-layer version of the port could theoretically provide an even greater insulting capability for a given thickness. However, as inferred above, this version would also make the liner more complex and more difficult to manufacture.

Materials appropriate for use in forming the FRCMC layers of either the solid or multi-layered embodiments of the port liner of the present invention are generally are made by combining a pre-ceramic polymer resin, such as silicon-carboxyl resin sold by Allied Signal under the trademark BLACKGLAS or alumina silicate resin (commercially available through Applied Poleramics under the product description CO2), with some type of fibers. Examples of types of fibers which might be employed in an FRCMC material include, but are not limited to, alumina, Altex, Nextel 312, Nextel 440, Nextel 510, Nextel 550, silicon nitride, silicon carbide, HPZ, graphite, carbon, and peat. It is noted that these same types of fibers would preferably be chosen for use in the version of the previously-described intermediate layer 28 (of FIGS. 2A–B) which employs fibers. The fibers can be supplied in the form of rigid or binderized preforms, woven or braided preforms, random mat preforms, fabric, tow (thread), or chopped tow or fabric. Typically, the method of forming the FRCMC layers will dictate which form or forms of fibers appropriate for the process. Examples of some appropriate methods of forming the FRCMC layers will be described later in this disclosure. To add toughness to the material, the fibers being incorporated into the FRCMC layers are preferably first coated to a few microns thickness with an interface material such as, but not limited to, carbon, silicon nitride, silicon carbide, silicon carboxide, boron nitride or multiple layers of one or more of these interfacial materials. The interface material prevents the resin from adhering directly to the fibers of the fiber system. Thus, after the resin has been converted to a ceramic, there is a weak interface between the ceramic matrix and the fibers. This weak bond enhances the ductility exhibited by the FRCMC material. In addition, the FRCMC material can include filler materials preferably in the form of powders having particle sizes somewhere between about 1 and 50 microns. These filler material can include one or more of the following materials: alumina, silicon carbide, silicon nitride, or other commercially available ceramic powders. The resin, fiber, and possibly filler material mixture is generally formed into the shape of the desired structure via one of a variety of methods and heated for a time to a temperature, as specified by the material suppliers, which causes the resin to be converted into a ceramic.

The fibers and interface materials incorporated into the FRCMC material provide the ductility lacking in monolithic ceramic constructions. Ductility is the measure of how much strain the structure can withstand before fracturing. This ductility gives the FRCMC material the strength to withstand the rigors of general handling and thermal-induced strain associated with a widely varying temperature environment, as well as the thermal shock the material might be subjected to as a result of being cast-in-place. Thus, the problems associated with monolithic ceramic port liners are overcome by the use of FRCMC materials. The types of fibers which can be employed to produce the desired degree of ductility are any of those mentioned previously, or any combination of those fibers. However, as the degree of ductility necessary to prevent failure of the port liners will vary depending on the type of IC engine involved, it can be desirable to tailor the degree of ductility exhibited by the FRCMC material.

An example of tailoring the ductility of the FRCMC material used in a port liner in accordance with the present invention is shown by the case where enough fibers to make up about 50 percent of the volume of the structure are incorporated in the material. This amount of fiber produces a ductility of approximately 0.60 percent strain. Less fiber volume than this would produce a lower ductility, and more fiber volume would produce a higher ductility. Other characteristics of the FRCMC material can also be of interest in the design of the port liner according to the present invention. For example, the thermal conductivity of the FRCMC material, especially in the solid wall embodiment, is an important characteristic. The thermal conductivity can be tailored to some extent by the choice of fibers and/or the incorporation of certain filler materials.

Generally, the above-described tailoring involves incorporating the appropriate type of fibers into the composite in sufficient quantities to produce the desired degree of a characteristic, such as the exhibited ductility and/or thermal conductivity. Additionally, the tailoring can involve incorporating the appropriate types of filler material into the composite in sufficient quantities to produce the desired degree of thermal conductivity. In both cases, the degree to which these respective characteristics are exhibited varies with the type and percent by volume of fibers and filler materials incorporated into the structure. The ductility exhibited by a FRCMC material can also be tailored by selecting the form of the fibers. Namely, selecting either a continuous or a non-continuous configuration. A continuous fiber configuration corresponds to woven fiber systems where the individual fibers typically run the entire length of the FRCMC structure. Whereas, non-continuous fiber configurations are associated with loose fibers which often terminate within the structure itself. Fibers in a continuous fiber configuration will produce a higher degree of ductility than will a non-continuous fiber configuration. Finally, it is noted that the choice of interface material can have an effect on the degree of ductility exhibited by the FRCMC material.

However, there can be a tradeoff involved in the tailoring process. Generally, the greater the amount of fibers in the FRCMC material, the greater its thermal conductivity. If it is desired to limit the thermal conductivity to a desired level, this can be accomplished by restricting the amount of fibers making up the FRCMC material. This will, of course, also limit the degree of ductility that can be imparted to the composite by the fibers. However, if the amount of fibers incorporated into the FRCMC material has to be limited in order to achieve a desired thermal conductivity to the point that the necessary ductility would not be achieved, the ductility can still be enhanced by choosing the types of fibers, the form of the fibers, and the interface materials which will produce the maximum degree of ductility. In this way, it may be possible to obtained both the desired thermal conductivity and ductility using the same amount of fibers. If the approach is taken to select the type of fibers which will ensure the desired degree of ductility, the impact of the type of fibers on the thermal conductivity of the composite must also be considered in choosing the fibers. Generally, the use of ceramic fibers will minimize the thermal conductivity of the FRCMC material, as opposed to, for example, carbon fibers which would tend to increase the thermal conductivity. Thus, it is preferred that ceramic fibers be chosen when it is desired to both enhance the ductility and to minimizing thermal conductivity.

Another approach that could be taken to tailor the thermal conductivity of the FRCMC material involves the addition of an appropriate filler material. This approach would provide a second way of obtaining the desired thermal conductivity, while at the same time employing the amount, type, and form of fibers (and interface material) which would ensure the desired ductility is also achieved.

Figure 3:
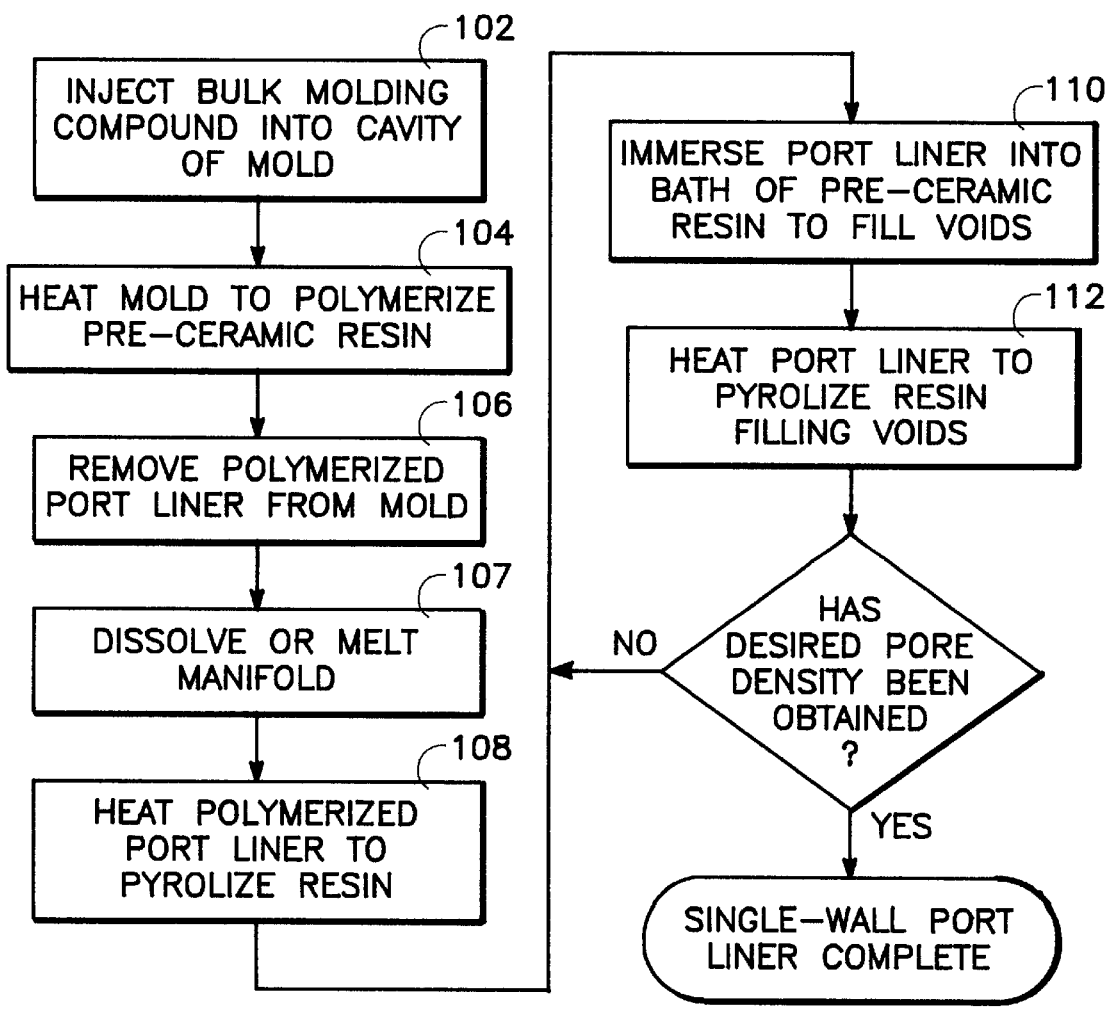
FIG. 3 is a block diagram of a method for the forming of the solid wall port liner of FIG. 1.

The preferred method for forming both the solid-wall and multi-layer embodiments of the port liner according to the present invention is by injection molding. As described below and summarized in FIG. 3, injection molding of the solid wall embodiment generally entails the steps of:

(a) Injecting a quantity of bulk molding compound into a cavity of a mold (step 102) using the methods and an injection apparatus as disclosed in a co-pending application entitled COMPRESSION/INJECTION MOLDING OF POLYMER-DERIVED FIBER REINFORCED CERAMIC MATRIX COMPOSITE MATERIALS having some of the same inventors as the present application and assigned to a common assignee. This co-pending application was filed on Feb. 28, 1996 and assigned U.S. Ser. No. 08/704,348, now U.S. Pat. No. 5,738,818. The disclosure of this co-pending application is hereby incorporated by reference. The aforementioned bulk molding compound is a mixture which includes th above-described pre-ceramic resin, non-continuous "chopped" fibers, and possibly filler materials.

(b) Heating the mold at a temperature and for a time associated with the pre-ceramic resin which polymerizes the resin to form a fiber-reinforced polymer composite structure (step 104).

(c) Removing the polymerized composite structure from the mold (step 106).

(d) And, heating the polymerized composite structure at a temperature and for a time associated with the polymerized resin which pyrolyzes it to form a FRCMC structure (step 108).

Once the FRCMC part is molded via the injection molding process, it is preferred that an additional procedure be performed to eliminate pores created during the required heating cycles. Eliminating these pores strengthens the part. Specifically, after the completion of the heating step which pyrolyzes the FRCMC part, the part is immersed into a bath of a pre-ceramic resin to fill the pores (step 110). The part is then heated at a temperature and for a time associated with the resin filling the pores so as to transform it to a ceramic material (step 112). Unfortunately, the process of heating the resin filling the pores will create further pores. Accordingly, it is desired that the filling and heating steps be repeated until the pore density within the FRCMC part is less than a prescribed percentage by volume. This prescribed percentage corresponds to the point where the part will exhibit a repeatable strength from one part to the next. It is believed five iterations of the filling and firing process are required to obtain this repeatable part strength. To facilitate the filling step, it is preferred that the resin has a water-like viscosity. In addition, the FRCMC part could be placed in a vacuum environment to assist in the filling of the pores.

Figure 4:
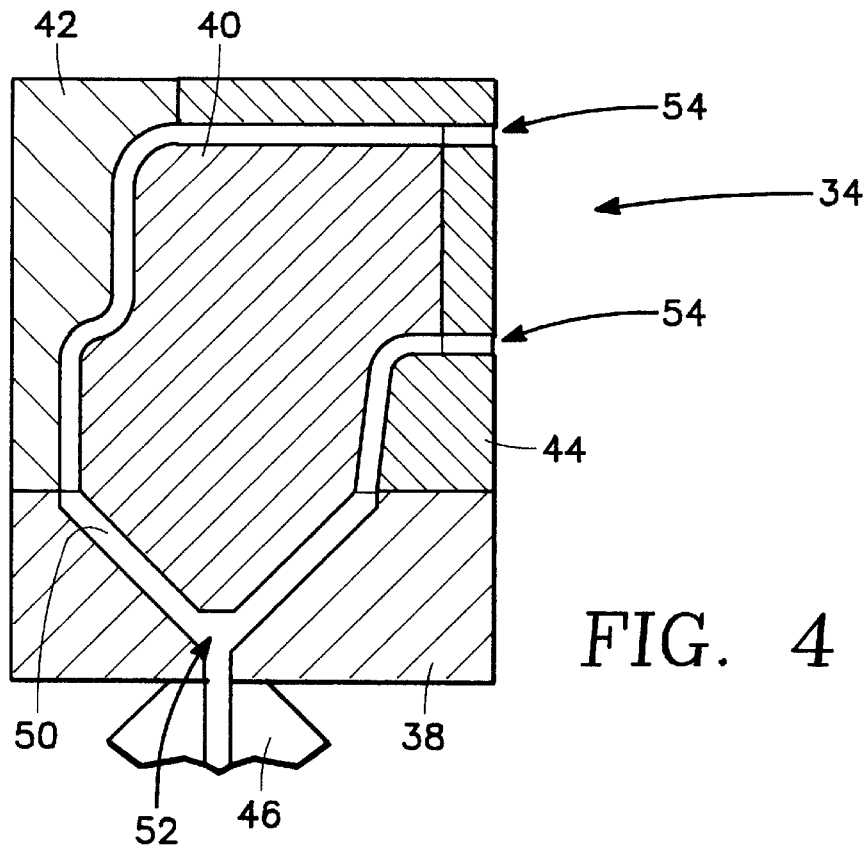
FIG. 4 is a cross-sectional view of an injection mold capable of molding the solid wall port liner of FIG. 1, or the inner layer of the multi-layer port liner of FIG. 2A.

An example of a mold 34 which can be used to form the solid-wall embodiment of a FRCMC port liner by the above-described injection molding method is shown in FIG. 4A. The mold 34 includes a bottom piece 38 that supports a curved cylindrical mandrel 40 having an exterior surface corresponding to the dimensions of the interior of surface of the port liner. The mandrel 40 is either a "wash-out" type mandrel, or one made of wax or plastic. The wash-out type mandrel is removed after the port liner has been formed by dissolving it via conventional methods (step 107 of FIG. 3), such as with a high pressure water jet. A wax or plastic mandrel, on the other hand, is removed once the port liner is formed by melting it (step 107 of FIG. 3). Two semi-cylindrical half-side portions 42, 44 surround the mandrel 40 and have an internal surface corresponding to the dimensions of the exterior surface of the port liner being formed. Accordingly, the side portions 42, 44 and mandrel 40 define the mold's internal volume which has the shape of the port liner being formed. The mold's internal volume is connected by a series of sprue channels 50 to an inlet 52 which interfaces with the injection molding apparatus 46. The right-hand side portion 44 contains a series of resin outlet ports 54 to allow excess resin to escape during the molding process.

Figure 6A:
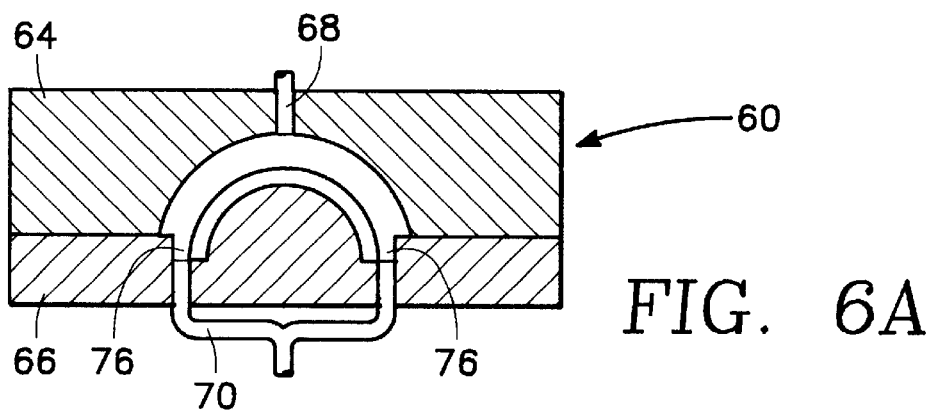
FIGS. 6A–B are cross-sectional views of injection molds capable of molding the two side pieces of the outer layer of the multi-layer port liner of FIG. 2A.
Figure 6B:
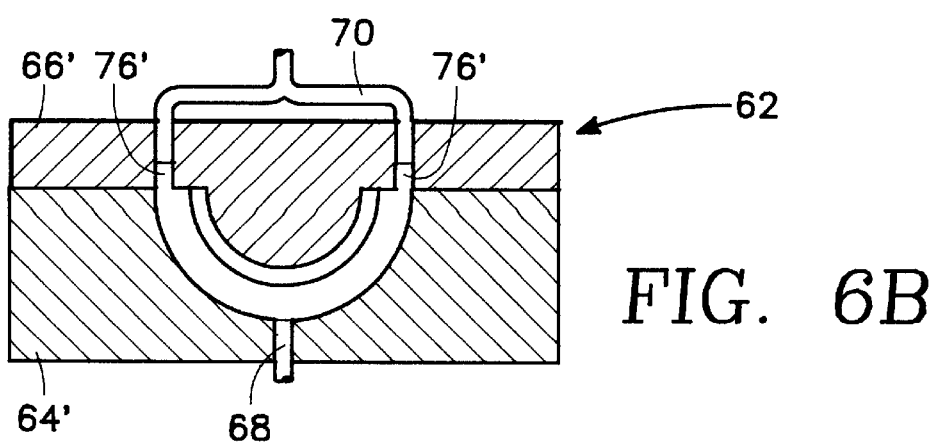
Figure 5A:
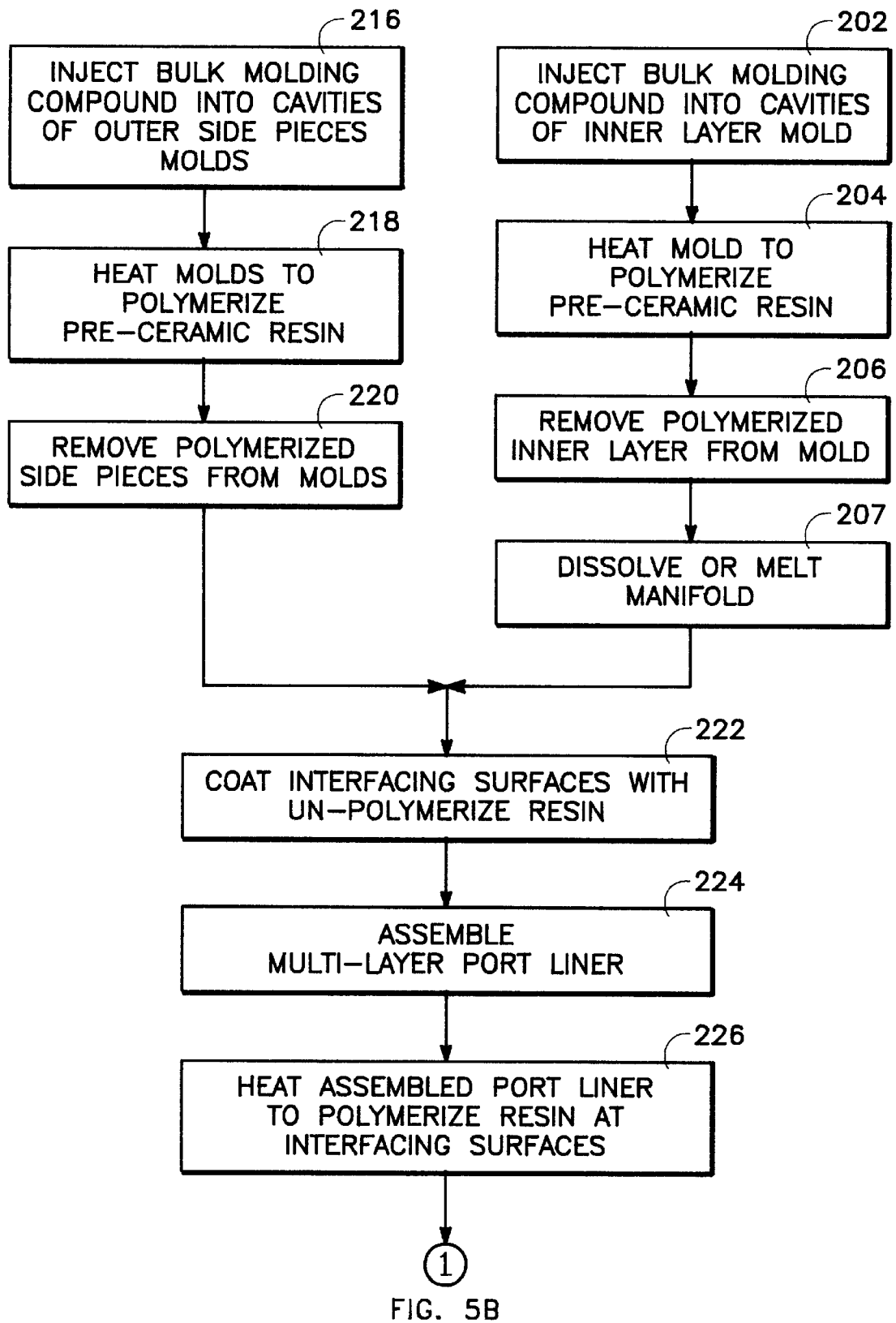
FIG. 5 is a block diagram of a method for the forming of the multi-layer port liner of FIG. 2A.
Figure 5B:
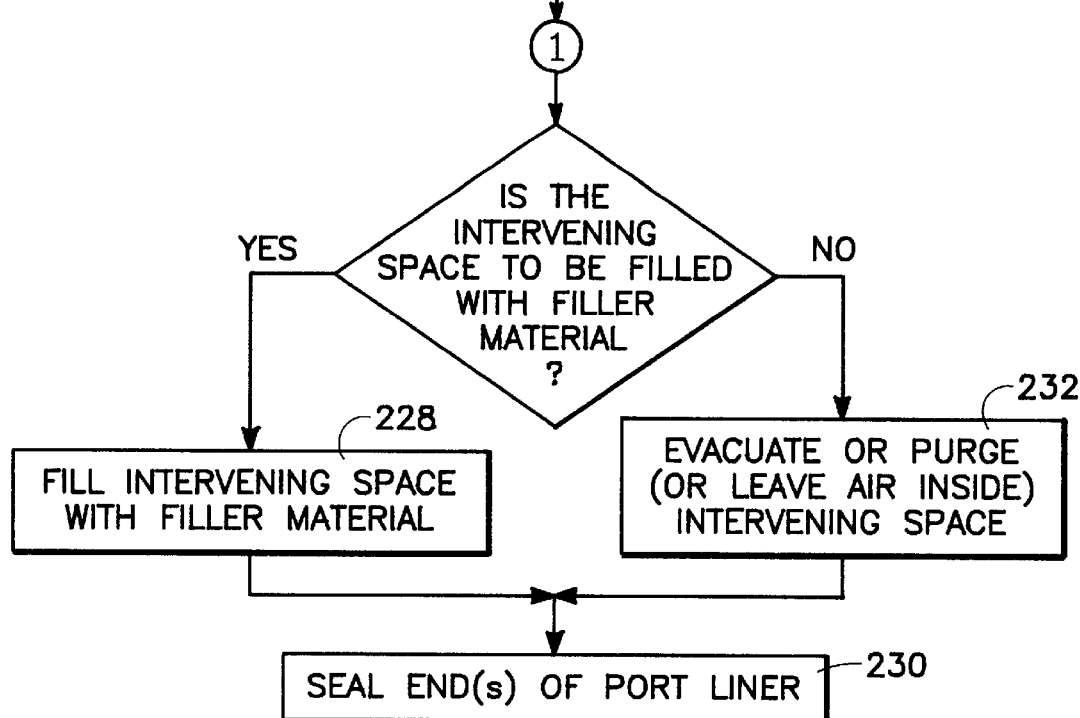

Forming the multi-layer port liner embodiment starts with fabricating an inner layer. This inner layer is essentially the same structure as the previously-described solid-wall embodiment of the invention, except that it may in some cases be thinner so as to reduce the size of the finished part which will also include an outer and intervening insulation layer. The inner layer is preferably injection molded via the same process (FIG. 3) and using a similar mold (FIG. 4) as employed to form the solid-wall port liner embodiment. As shown in FIG. 5, the previously-described injection molding process is followed up to and including the mandrel removing step (i.e. steps 202–207 of FIG. 3). Next, the outer layer is formed. This is also accomplished via the initial steps of the previously-described injection molding process (i.e. steps 216–220), except it is molded in two-parts using the exemplary molds depicted in FIGS. 6A and 6B. The mold 60 of FIG. 6A is used to produce a first side piece of the outer wall of the multi-layer port liner, and the mold 62 of FIG. 6B is used to form the second side piece. Each mold 60, 62, has a two-part design which includes a back section 64, 64' and a front section 66, 66'. The front section 66, 66' includes sprue channels 70 through which the molding compound is injected, and the back section 64, 64' includes a resin outlet ports 68 through which excess resin escapes. Preferably, the mold 60 forms the first side piece 72 of the outer layer as shown in FIG. 7A, and mold 62 forms the second side piece 74 of the outer layer as shown in FIG. 7B. The side pieces 72, 74 have interfacing features along their longitudinal edges which facilitates their joining and alignment to form the outer layer of the port liner. For example, as depicted in FIGS. 7A and 7B, each side piece 72, 74 can have a projection 76, 76' extending from its longitudinal edges. The projection 76 of the first side piece 72 is offset laterally from the projection 76' of the second side piece 74. Thus, when the two sides pieces 72, 74 are brought together, the projections 76, 76' overlap, thereby aligning the two sides pieces. In addition to the projections 76, 76', it is also preferred that a first end 78 of each side piece 72, 74 have a ledge 80 which extends radially inward away from the inner surface of the side piece. The ledges 80 associated with the first ends 78 of the side pieces 72, 74 are unbroken and extend inwardly far enough that once the two sides pieces are joined together the ledges form a flange having an opening with the same dimensions as the exterior of the inner layer. In the illustrated case, the port liner has a circular cross-section, and so the opening forming by the flange has the same diameter (within reasonable tolerances) as the outer diameter of the inner layer. This structure results in the intervening space between the inner and outer walls being closed by the flange at the first end of the port liner when the liner is assembled (as will be described below). Additionally, the flange acts as a standoff which positions the first end of the inner layer within the outer wall and dictates the shape of the intervening space at the that end. In the illustrated case, the flange at the first end of the liner centers the inner layer within the outer layer forming an annular intervening space. In the version of the multi-layer port liner embodiment where air is employed to fill the intervening space between the inner and outer layers, ledges are formed at the second end 82 of the side pieces 72, 74 which are identical to those at the first end 78. Thus, when the port liner is assembled, a flange is also formed at the second end to close that end and trap air inside the intervening space. However, in the versions of the multi-layer embodiment where the intervening space is filled with a gas other than air, evacuated, or filled with some type of filler material, ledge segments 84 are formed at the second end 82 of each side piece 72, 74 which are separated by gaps 86. The ledge segments 84 at the second end of the side pieces extend inwardly far enough to interface with the outer surface of the inner layer, and act as standoffs positioning the inner layer within the outer layer at the second end of the port liner. However, due to the gaps 86, the second end of the port liner is not closed. This allows the intervening space to be filled. In the illustrated case, four such gaps 86 are formed so as to facilitate the filling of the intervening space with filler material. This is meant as an example only. The actual number and size of the gaps is preferably chosen so as to ensure the selected filler material can be readily inserted and the intervening space completely filled. This can be easily determined by one skilled in the art given the size of the intervening space and the type of filler material. If the space is to be evacuated only one gap would be necessary. And, if the space is too be filled with a gas other than the ambient air, as few as two gaps would be required, i.e. one to let the gas in and one to exhaust the air originally trapped within the space. These gaps may even take the form of a small holes instead. When two gaps or holes are used to inject gas into the intervening space, they should be formed in diametrically opposed ledges, and preferably on opposite ends of the port liner as well.

Referring again to FIG. 5, all the interfacing surfaces (e.g. the projections on the longitudinal edges of the outer layer side pieces and the distal ends of the ledges and ledge segments) are preferably coated with un-polymerized pre-ceramic resin (step 222) prior to assembling the port liner. Next, the multi-layer port liner is assembled by joining the two sides pieces of the outer layer together such that they surround the inner layer, and such that the ledges and ledge segments on both ends of the outer layer side pieces interface with the outside surface of the inner layer at its respective ends (step 224). The assembled port liner is then heated so as to polymerize the resin at the interfacing regions and thereby form a unitary port liner structure (step 226).

The processing steps required to fill and/or seal the intervening space are now performed. The space can be filled with insulating material (e.g. ceramic powder, ceramic foam, or dry fibers) to form the intermediate layer 28 (FIG. 2B), as shown in step 228. These insulating materials can be placed into the space between the inner and outer walls of the port liner by any conventional method. For example, the space can be filled by interfacing the end of the liner having the gapped flange with a supply of the filler materials and causing the material to completely fill the intervening space by shaking the liner with the gappeed flange facing upward on a shaker table. Once the insulation material is in place, the ends of the space are sealed (step 230). Preferably, this step entails filling the gaps with FRCMC material to create a completely closed flange at each end of the port liner. The FRCMC material preferably includes the same type of resin, fibers, and filler materials (if any) as was used to make the bulk molding compound. In the case where the space is to be at a vacuum, or filled with a gas, the space is either evacuated, or purged with the desired gas, rather than injecting any insulating material (step 232). This evacuation or purging process can be done via any appropriate conventional method. The ends of the port liner are then sealed, as described above.

The unitary, polymerized port liner structure is then pyrolized, and the pores filled as described above in conjuction with the forming of the solid wall embodiment of the invention (i.e. steps 208–212) to complete the forming process.

The above-described injection molding method requires that the fibers included in the bulk molding compound be in the form of chopped fibers, i.e. non-continuous. However, the continuous, woven fiber configuration can provide a greater degree of ductility to the FRCMC material. Therefore, if a woven form of fibers is employed to achieve the desired ductility, the injection molding method cannot be employed. In this case, it is preferred that a resin transfer molding (RTM) process be used, as described in a co-pending application entitled METHODS AND APPARATUS FOR MAKING CERAMIC MATRIX COMPOSITE LINED AUTOMOBILE PARTS AND FIBER REINFORCED CERAMIC MATRIX COMPOSITE AUTOMOBILE PARTS by the inventors herein and assigned to the common assignee of the present application. This co-pending application was filed on Aug. 16, 1995 and assigned U.S. Ser. No. 08/515,849. The disclosure of this co-pending application is hereby incorporated by reference. As shown in FIG. 8, the RTM method described in the co-pending application generally involves forming a preform or preforms in the shape of the part from the aforementioned fibers (step 302); placing the preform(s) in a cavity of a mold having the shape of the port liner in the case of the solid wall embodiment or having the shape of the various port liner components in the case of the multi-layer embodiment (step 304); forcing a liquid pre-ceramic polymer resin through the mold cavity to fill the cavity and saturate the preform(s) (step 306); heating the mold at a temperature and for a time associated with the pre-ceramic polymer resin which transforms the liquid pre-ceramic polymer resin-saturated preform(s) into a polymer composite part (step 308); removing the polymer composite part(s) from the mold(s) (step 310); if forming a multi-layer port liner, assembling the components and filling the intervening space as described previously (step 312); and, firing the polymer composite port liner in a controlled atmosphere at a temperature and for a time associated with the pre-ceramic polymer which transforms it into a ceramic (step 314), whereby the polymer composite part is transformed into a fiber reinforced ceramic matrix composite port liner.

The same molds described above in connection with FIGS. 4, 6A, and 6B can be employed in the RTM process. However, the molds are used in a different way. In the case of the solid-wall port liner mold, a woven fiber preform having the thickness of the internal chamber is slipped over the mandrel prior to assembling the mold. The inner layer of the multi-layer port liner is formed in the same way. The outer layer side pieces of the multi-layer embodiment are formed by placing a shaped preform into the mold cavities. In addition, the sprue channels of the molds are connected to a reservoir containing pre-ceramic resin, rather than to an injection apparatus. And finally, the resin outlet ports of the molds are connected to a vacuum source.

With the preform(s) in place, the vacuum source is activated for creating a vacuum and the path to the resin reservoir is opened. Resin under pressure is forced into the mold and through the preform(s) from the combined pressure and the vacuum from the vacuum source until the preform(s) is totally saturated with the resin.

Once either of the embodiments of the port liner 12, 12' (of FIGS. 1 and 2A–C) has been formed, it is integrally cast into the iron or aluminum head 14 of an IC engine. This is accomplished, as shown in FIG. 9, by placing the desired number of port liners within a mold compatible for casting metal for the head of an IC engine (step 402). Each port liner to be incorporated is positioned in the mold such that the metal will be cast around the port liners to form the intake and exhaust ports of the engine. The mold is then filled with molten metal to cast the engine head (step 404). The liner is firmly held in place within the metal when the metal cools and hardens. Since the liner is made from a ductile FRCMC material, it is able to withstand the thermal shock and temperatures of the metal molding process without being damaged.

While the invention has been described in detail by reference to the preferred embodiment described above, it is understood that variations and modifications thereof may be made without departing from the true spirit and scope of the invention.

Wherefore, what is claimed is:

1. A heat-resistant, thermally insulative, ductile port liner for a head of an internal combustion engine, comprising:
    a tube-shaped structure comprising at least one layer of fiber reinforced ceramic matrix composite (FRCMC) material formed from a polymer-derived ceramic precursor resin in its ceramic form and fibers, said fibers capable of producing a desired degree of ductility in the FRCMC material.

2. The port liner of claim 1, wherein the tube-shaped structure has one FRCMC layer forming a sole, solid wall of the structure.

3. The port liner of claim 1, wherein the tube-shaped structure comprises two FRCMC layers forming inner and outer walls of the structure, respectively, said inner and outer walls being separated by an intervening space.

4. The port liner of claim 3, wherein the intervening space is sealed at both ends of the port liner.

5. The port liner of claim 4, wherein the intervening space is sealed with FRCMC material which bridges the gap between the inner and outer walls.

6. The port liner of claim 3, wherein the intervening space is filled with a thermally insulating material.

7. The port liner of claim 6, wherein the thermally insulating material comprises at least one of ceramic powder, ceramic foam, and fibers.

8. The port liner of claim 3, wherein the intervening space is evacuated and exhibits substantially a vacuum pressure.

9. The port liner of claim 3, wherein the intervening space is filled with a gas.

10. The port liner of claim 9, wherein the gas comprises at least one of argon, nitrogen, and air.

11. The port liner of claim 1 wherein the polymer-derived ceramic resin is chosen from silicon-carboxyl resin, or alumina silicate resin.

12. The port liner of claim 1 wherein the fibers comprise at least one of alumina, Nextel 312, Nextel 440, Nextel 510, Nextel 550, silicon nitride, silicon carbide, HPZ, graphite, carbon, and peat.

13. The port liner of claim 1, wherein the degree of ductility caused by the fibers varies with the percentage by volume of the fibers in the FRCMC material, and wherein the percentage by volume of the fibers in the FRCMC material is within a range of about 20 to 60 percent.

14. The port liner of claim 13, wherein the fibers in the FRCMC material produce a degree of ductility between 0.15 and 0.60 percent strain.

15. The port liner of claim 13, wherein the form of the fibers incorporated into the FRCMC material has either a continuous configuration or a non-continuous configuration, said fiber form also affecting the degree of ductility exhibited, and wherein the fiber form employed is chosen to, in combination with the quantity of fibers, produce the desired degree of ductility.

16. The port liner of claim 1, wherein the fibers are coated with an interface material which increases the degree of ductility exhibited by the FRCMC material.

17. The port liner of claim 16 wherein the interface material comprises at least one 0.1–5.0 micron thick layer of at least one of carbon, silicon nitride, silicon carbide, and boron nitride.

18. The port liner of claim 1, wherein the FRCMC material further comprises a filler material which increases the thermal insulating capability of the material.

19. The port liner of claim 18, wherein the filler material comprises at least one of alumina, silicon carbide, silicon nitride.

20. The port liner of claim 18, wherein the degree of thermal insulation provided by the filler material varies with the percentage by volume of the structure consisting of the filler material, and wherein there the percentage by volume of the FRCMC material consisting of filler material is within a range of about 10 to 40 percent to produce a desired degree of thermal insulation.

* * * * *